United States Patent [19]

Leshik et al.

[11] 4,341,809

[45] Jul. 27, 1982

[54] STABILIZED STARCH COMPOSITION

[75] Inventors: Richard R. Leshik; Jay H. Katcher, both of Dover, Del.

[73] Assignee: General Foods Corporation, White Plains, N.Y.

[21] Appl. No.: 206,101

[22] Filed: Nov. 12, 1980

[51] Int. Cl.$^3$ ............................................. A23L 1/195
[52] U.S. Cl. .................................... 426/576; 426/578; 426/579
[58] Field of Search ........................ 426/576, 579, 578

[56] References Cited

U.S. PATENT DOCUMENTS

| | | | |
|---|---|---|---|
| 2,801,242 | 7/1957 | Kerr | 426/578 |
| 2,801,924 | 8/1957 | Clausi | 426/579 |
| 2,852,393 | 9/1958 | Kerr | 426/578 |
| 3,021,222 | 2/1962 | Kerr | 426/578 |
| 3,471,301 | 10/1969 | Mitchell et al. | 426/576 |
| 3,539,358 | 11/1970 | Hing | 426/579 |
| 4,215,152 | 7/1980 | O'Rourke | 426/579 |

Primary Examiner—Jeanette M. Hunter
Attorney, Agent, or Firm—Thomas R. Savoie; Daniel J. Donovan

[57] ABSTRACT

A stabilized starch composition is prepared which is resistant to degradation under dry acidic storage conditions by adding a buffer to a slurry of starch in an amount effective to protect and stabilize the starch from acid degradation, then drying the starch-buffer slurry.

26 Claims, No Drawings

STABILIZED STARCH COMPOSITION

BACKGROUND OF THE INVENTION

The present invention is concerned with preparing a starch composition which, when added to a dry mix containing acid and subjected to storage conditions, is resistant to degradation of the starch by the acid. This starch composition is especially usefull in dry dessert mixes, for example, acidic dry instant pudding mixes, which contain sufficient acid to degrade the starch under storage. This invention by providing an acid resistant dry starch avoids the necessity of using expensive coated acids to prevent such starch degradation under storage conditions. When dry starch is exposed to acid under dry storage conditions the starch undergoes hydrolysis and the resultant degraded starch when hydrated, generally loses viscosity and tends to produce a softer, looser or gummier texture as compared to the starch prior to storage.

The art discloses coating acid to prevent acid from interacting with the other ingredients of a dry mix. While this method does prevent the acid from interacting and degrading the starch, it is generally not suitable for a system where fast acid release is desired upon hydrating the dry mix, since the coating on the acid must be dissolved or melted before the acid is released. Additionally, a coated acid is expensive, and a dry mix containing a coated acid requires a low moisture content to prevent the coating from being dissolved and releasing the acid prematurely during storage and degrading the starch. U.S. Pat. Nos. 3,031,308, 3,434,848, 3,666,493, and 3,770,461 disclose the use of a buffer, such as sodium citrate, in an acidic product containing starch to maintain a desired pH in a final hydrated product for flavor. However, these systems do not protect the starch in that they do not provide that the buffer is co-dried with the starch or that the buffer will provide a protective environment for the starch against the acid under dry storage conditions.

It is an object of the present invention to provide a starch which is resistant to acid degradation under dry storage conditions.

It is a further object of this invention to provide a dry mix containing starch and acid in which the starch and acid do not interact to degrade the starch during storage, and upon hydration of the dry mix a tasty acidic product with a desireable fresh starch flavor, texture and viscosity is obtained.

It is still a further object of this invention to prepare a dry dessert mix containing starch and acid in which the starch is stable against acid degradation under dry storage conditions.

SUMMARY OF THE INVENTION

Briefly, the present invention stabilizes the starch against degradation by acid under dry storage conditions by adding to a slurry of starch, a buffer in an amount effective to protect and stabilize the starch from acid degradation under dry acidic storage conditions, and then drying the slurry. This starch composition is particularly applicable to stabilizing pregelatinized starches for use in products such as dry acidic instant pudding mixes. The preferred buffer is trisodium citrate.

DETAILED DESCRIPTION OF THE INVENTION

The stabilized starch composition which is resistant to acid under dry storage conditions is prepared by adding a buffer to a slurry of starch, followed by drying the starch-buffer slurry. Various starches which are subject to acid degradation under dry acidic storage conditions can be stabilized by this invention including chemically or physically modified starches, raw starches or pregelatinized starches, as well as starches from various sources, such as tapioca, corn, waxy maize, potato, etc. The preferred starch which is useful in products such as instant pudding mixes is a pregelatinized modified starch, such as a crosslinked and hydroxypropylated starch, a crosslinked and acetylated starch, a crosslinked starch, etc. The slurry is preferably an aqueous slurry and the solids level of the slurry is at a level convenient for subsequent handling and drying, generally less than 60% solids by weight.

The buffer which is added to the starch slurry prior to drying, by definition will provide and maintain a neutral to alkaline environment for the dry starch particles to protect the starch from acid degradation. That is, the buffer will neutralize the acid which comes into contact with the starch particles to maintain an environment for the starch particles wherein acid degradation is prevented. Generally, the environment of the starch particles to prevent acid degradation must be maintained between a pH of 5 to 12, preferably 6 to 9. Suitable buffers include hydroxides of various metals or alkaline salts, such as trisodium citrate, trisodium phosphate, sodium hydroxide etc. The buffer, critically is added to the slurry of starch in an amount effective to stabilize the dry starch by maintaining a pH environment for the dry starch particles which prevents acid degradation when the starch is dry mixed and stored with an acid. The effective amount of buffer to stabilize the starch when mixed with acid and under storage conditions can vary depending upon the buffer and the type and amount of acid the dry starch is to be mixed with, but generally the amount of buffer is within the range of 0.05% to 10% by weight of the dry starch and preferably 0.25% to 3% by weight of the dry starch. The buffer in the amounts used generally does not appreciably effect the final pH of the finished product when the dry mix is hydrated. However, the buffer effectively controls the immediate environment of the dry starch particles, protecting the dry starch from degradation by the acid in a dry mix under storage conditions. By environment of the starch, what is meant is that which the starch particles are physically subjected to or interact with.

The slurry of starch and buffer is then dried by conventional processes, such as drum drying, flash drying, or spray drying. Conveniently, the drying procedure can also be employed to gelatinize the starch thus producing a pregelatinized, stabilized starch. When codrying the starch with buffer additional ingredients may be added to chemically or physically modify the textural attributes of the starch. A desireable physical modifier to be co-dried with the starch and buffer is a hydrocolloid, preferably gelatin, to provide additional body and smoothness to the starch when hydrated.

The resultant dry stabilized starch composition provides a starch with a microenvironment of buffer that protects the starch from acid hydrolysis under dry storage conditions. Without the microenvironment of protective buffer the starch under acidic storage conditions, such as typically found in acid containing dry dessert mixes, in a short time would undergo depolymerization by acid hydrolysis and lose thickening ability (viscosity). As well, the degraded starch would tend to produce a softer, looser or gummier texture as compared to the desireable texture and viscosity of the starch prior to storage. When a buffer, such as trisodium citrate, was added as a separate ingredient (not codried with the starch) to an acidic dry mix containing starch, and then placed under storage conditions, the resultant starch underwent degradation and was not storage stable, as compared to the codried starch and buffer composition of this invention.

Typically, the starch stabilized by this invention is found to be stable and maintain its desireable viscosity and textural characteristics after one year under dry acidic storage conditions, as compared to a starch without the buffer system in which unacceptable acid degradation is evident by five months under dry acidic storage conditions. Generally, accelerated storage conditions involve 9 to 12 weeks at 110° F.

To provide acidic conditions in the dry mix an acid in dry form, such as adipic acid, fumaric acid, citric acid, malic acid, etc., is added and dry mixed with the starch, generally in amounts effective to impart the dry mix when hydrated with an acidic pH, e.g. a pH of 3 to 6. The acid is usually added for taste and texture characteristics and depending upon the type of acid and desired pH, the amount of acid is generally 1-5% by weight of the dry mix.

Through use of the stabilized starch composition a dry mix containing acid and starch can be prepared which, after storage and upon hydration, maintains the same quality flavor, texture and viscosity as a freshly prepared dry mix. The following examples are illustrative of the invention and do not limit the scope of the present invention, which is defined in the appended claims.

EXAMPLE I

Trisodium citrate was added at a level of about 1% by weight of the starch solids to an aqueous, tapioca starch slurry which had been hydroxypropylated and crosslinked with propylene oxide and phosphorous oxychloride. The pH of slurry was about 6. Following drum drying this slurry, the codried starch composition at a level of about 15% by weight was blended into an instant yogurt pudding mix base containing about 3% by weight of malic acid as well as sugar, yogurt powder, gelatin, color, oil, emulsifiers, flavor and non-fat milk solids. A control sample of drum dried hydroxypropylated and cross-linked tapioca starch without added buffer was also blended at the same level into an identical instant yogurt pudding mix base containing malic acid.

Both samples were packaged in a foil pouch and placed in an accelerated storage of 9 and 12 weeks at 110° F. and evaluated after the storage by beating about 125 grams of the instant pudding mix into 2 cups of cold milk, followed by allowing the pudding to set. The finished pudding had a pH of about 4.2. At 9 weeks the control sample of pudding mix upon hydration showed a substantial loss of viscosity of from 44,000 centipoise prior to storage to 13,000 centipoise after storage, as well as exhibiting a softer, looser and gummier texture after storage. At 9 weeks the pudding mix containing the codried buffered-starch composition upon hydration exhibited a viscosity of 44,000 centipoise prior to storage and substantially maintained this viscosity at a level of 34,000 centipoise after storage, as well as maintaining its desireable texture after storage. Even at 12 weeks the pudding mix containing the codried buffered-starch composition upon hydration maintained its viscosity at 35,000 centipoise, as well as maintaining its desireable texture after storage.

EXAMPLE II

An aqueous slurry of tapioca starch, which was crosslinked with phosphorous oxychloride, was mixed with the following amounts of the following buffers. After gelatinizing and drying the slurry, the starches were evaluated by mixing each starch into an instant yogurt pudding mix base as detailed in Example I, packaging the samples in a foil pouch, and placing the samples in an accelerated storage of 9 weeks at 110° F.

| Buffer | Amt of buffer by weight of starch | pH of starch slurry | Textural Characteristics upon hydration of pudding mix |
|---|---|---|---|
| Trisodium citrate | 2% | 6 | very good (maintained texture) |
| Sodium hydroxide | 0.4% | 11 | very good (maintained texture) |
| Trisodium phosphate | 2% | 8 | good (maintained texture) |
| No buffer | 0 | 6 | unacceptable; developed soupy, stringy and mucid texture |

As evident from the above samples, by adding an amount of a buffer to provide and maintain a neutral to alkaline environment for the starch particles, the starch was protected from degradation by the acid and the starch was able to maintain its desireable textural characteristics under dry acidic storage conditions.

What is claimed is:

1. A process for preparing a dry starch composition which is resistant to degradation when dry mixed with an acid and stored dry comprising:
    (a) forming an aqueous starch slurry;
    (b) adding buffer to the slurry, wherein the amount of buffer added is between 0.05% and 10% by weight of the starch so that the pH of the starch slurry is between 5 and 12 after said buffer addition; and then
    (c) drying the starch and buffer slurry.
2. Process of claim 1 wherein the buffer is chosen from the group consisting of trisodium citrate, trisodium phosphate and sodium hydroxide.
3. Process of claim 1 wherein the buffer maintains the dry starch particles at a pH of 6 to 9.
4. Process of claim 1 wherein the dried starch is a pregelatinized starch.
5. Process of claim 1 wherein the starch slurry is dried by drum drying.
6. Process of claim 1 wherein the starch slurry is dried by spray drying.
7. Process of claim 1 further comprising grinding the dried starch to a desired particle size.
8. Process of claim 1 wherein the slurry further comprises a hydrocolloid.
9. Process of claim 8 wherein the hydrocolloid is a gelatin.
10. Process of claim 5 wherein the buffer is present at a level of 0.25 to 3% by weight of the starch.

11. Process of claim 2 wherein the buffer is chosen from the group consisting of hydroxides of metals and alkaline salts.

12. Process of claim 1 wherein the dried starch is an ungelatinized starch.

13. A starch composition which is resistant to degradation when dry mixed with an acid and under dry storage conditions comprising:

a codried slurry of starch and buffer, said buffer being present in an amount of between 0.05% and 10% by weight of the starch and effective to maintain the dry starch particles at a pH of 5 to 12 whereby said starch is protected and stabilized from acid degradation when the starch is dry mixed and stored with an acid.

14. Starch composition of claim 13 wherein the buffer is chosen from the group consisting of trisodium citrate, trisodium phosphate and sodium hydroxide.

15. Starch composition of claim 13 wherein the buffer maintains the dry starch particles at a pH of 6 to 9.

16. Starch composition of claim 13 wherein the dried starch is a pregelatinized starch.

17. Starch composition of claim 13 further comprising a hydrocolloid which has been codried with the starch and buffer.

18. Starch composition of claim 15 wherein the buffer is present at a level of 0.25% to 3% by weight of the starch.

19. Starch composition of claim 13 wherein the buffer is chosen from the group consisting of hydroxides of metals and alkaline salts.

20. Starch composition of claim 13 wherein the starch is ungelatinized.

21. A dry mix containing an acid and the starch composition of claims 13, 14 or 15.

22. Mix of claim 21 wherein the mix is a dessert mix.

23. A dry mix for producing a cooked pudding, such mix containing an acid and the starch composition of claim 20.

24. A dry mix for producing an instant pudding, such mix containing an acid and the starch composition of claim 16.

25. A dry mix according to claim 23 wherein the acid is between 1 and 5% of the total weight of the dry mix and sufficient to produce a pH between 3 and 6 when the mix is hydrated.

26. A dry mix according to claim 24 wherein the acid is between 1 and 5% of the total weight of the dry mix and sufficient to produce a pH between 3 and 6 when the mix is hydrated.

* * * * *